United States Patent [19]

Earp

[11] 3,919,637

[45] Nov. 11, 1975

[54] LOGIC CIRCUIT FAULT DETECTOR

[75] Inventor: Ronald Lee Earp, Burlington, N.C.

[73] Assignee: Bell Telephone Laboratories, Incorporated, Murray Hill, N.J.

[22] Filed: May 22, 1974

[21] Appl. No.: 472,115

[52] U.S. Cl. .......... 324/73 R

[51] Int. Cl.$^2$ .......... G01R 15/12

[58] Field of Search .......... 324/73 R; 235/153 AC

[56] References Cited

OTHER PUBLICATIONS

"Tester Checks IC's in 10's," pp. 149–150, Electronics, Oct. 12, 1970.

G. H. Peters, "Evaluating Digital Logic Card Tester," May/June 1972, Evaluation Engineering.

"Circuit Analyzer Does Factory–Type Tests in the Field," Feb. 14, 1972, Electronics.

Lyons, N. P., "Fault Track Universal Fault Isolation Procedure for Digital Logic," IEEE Intercon Technical Papers, Session 40, Mar. 26–29, 1974.

*Primary Examiner*—Alfred E. Smith

*Assistant Examiner*—Rolf Hille

*Attorney, Agent, or Firm*—H. L. Logan

[57] ABSTRACT

One known technique for testing a digital logic circuit assembly counts the logic level transitions at output and/or test point terminals while exercising the assembly with a fixed set of Gray code related input voltages. Many faulty assemblies are detected by the production of unexpected counts. The present disclosure teaches the addition of ONEs counting to improve the rate at which faulty assemblies are detected.

3 Claims, 9 Drawing Figures

FIG. 2
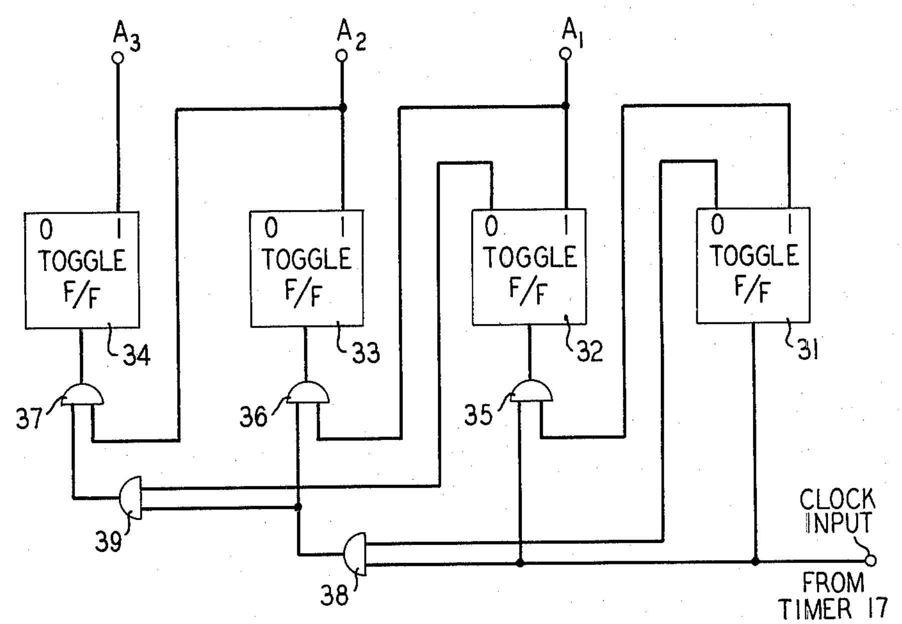
FIG. 3
| CLOCK PULSE | $A_3$ | $A_2$ | $A_1$ |
|---|---|---|---|
| 0 | 0 | 0 | 0 |
| 1 | 0 | 0 | 1 |
| 2 | 0 | 1 | 1 |
| 3 | 0 | 1 | 0 |
| 4 | 1 | 1 | 0 |
| 5 | 1 | 1 | 1 |
| 6 | 1 | 0 | 1 |
| 7 | 1 | 0 | 0 |
| 8 | 1 | 0 | 0 |
| 9 | 1 | 0 | 1 |
| 10 | 1 | 1 | 1 |
| 11 | 1 | 1 | 0 |
| 12 | 0 | 1 | 0 |
| 13 | 0 | 1 | 1 |
| 14 | 0 | 0 | 1 |
| 15 | 0 | 0 | 0 |
FIG. 4
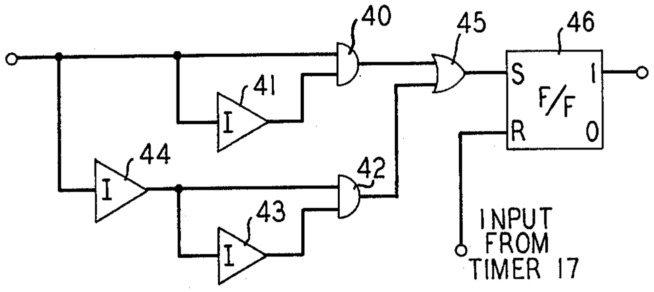
FIG. 5
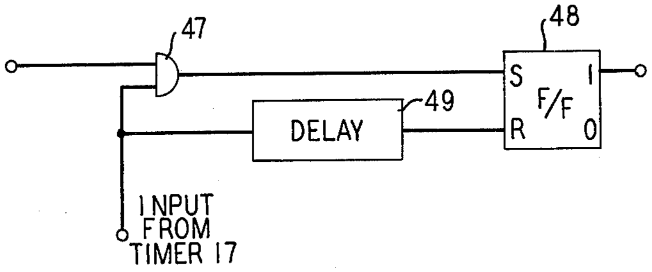

| BINARY NUMBER $A_3 A_2 A_1$ | K FOR GOOD CIRCUIT | K FOR PT 1 STUCK AT ONE | K FOR PT 1 STUCK AT ZERO | K FOR PT 2 STUCK AT ONE | K FOR PT 2 STUCK AT ZERO |
|---|---|---|---|---|---|
| 000 | 0 | 1 | 0 | 1 | 0 |
| 001 | 1 | 1 | 1 | 1 | 0 |
| 011 | 1 | 1 | 1 | 1 | 0 |
| 010 | 0 | 1 | 0 | 1 | 0 |
| 110 | 1 | 1 | 0 | 1 | 1 |
| 111 | 1 | 1 | 1 | 1 | 1 |
| 101 | 1 | 1 | 1 | 1 | 0 |
| 100 | 0 | 1 | 0 | 1 | 0 |
| 100 | 0 | 1 | 0 | 1 | 0 |
| 101 | 1 | 1 | 1 | 1 | 0 |
| 111 | 1 | 1 | 1 | 1 | 1 |
| 110 | 1 | 1 | 0 | 1 | 1 |
| 010 | 0 | 1 | 0 | 1 | 0 |
| 011 | 1 | 1 | 1 | 1 | 0 |
| 001 | 1 | 1 | 1 | 1 | 0 |
| 000 | 0 | 1 | 0 | 1 | 0 |
| TRANSITION TOTAL | 8 | 0 | 8 | 0 | 4 |
| ONES TOTAL | 10 | 16 | 8 | 16 | 4 |

| BINARY NUMBER $A_3$ $A_2$ $A_1$ | K FOR GOOD CIRCUIT | K FOR PT 1 STUCK AT ONE | K FOR PT 1 STUCK AT ZERO | K FOR PT 2 STUCK AT ONE | K FOR PT 2 STUCK AT ZERO | K FOR PT 3 STUCK AT ONE | K FOR PT 3 STUCK AT ZERO |
|---|---|---|---|---|---|---|---|
| 000 | 0 | 1 | 0 | 1 | 0 | 0 | 0 |
| 001 | 0 | 1 | 0 | 1 | 0 | 0 | 0 |
| 011 | 0 | 1 | 0 | 1 | 0 | 1 | 0 |
| 010 | 1 | 1 | 1 | 1 | 0 | 1 | 0 |
| 110 | 1 | 1 | 1 | 1 | 1 | 1 | 1 |
| 111 | 1 | 1 | 0 | 1 | 1 | 1 | 1 |
| 101 | 0 | 1 | 0 | 1 | 0 | 0 | 0 |
| 100 | 0 | 1 | 0 | 1 | 0 | 0 | 0 |
| 100 | 0 | 1 | 0 | 1 | 0 | 0 | 0 |
| 101 | 0 | 1 | 0 | 1 | 0 | 0 | 0 |
| 111 | 1 | 1 | 0 | 1 | 1 | 1 | 1 |
| 110 | 1 | 1 | 1 | 1 | 1 | 1 | 1 |
| 010 | 1 | 1 | 1 | 1 | 0 | 1 | 0 |
| 011 | 0 | 1 | 0 | 1 | 0 | 1 | 0 |
| 001 | 0 | 1 | 0 | 1 | 0 | 0 | 0 |
| 000 | 0 | 1 | 0 | 1 | 0 | 0 | 0 |
| TRANSITION TOTAL | 4 | 0 | 4 | 0 | 4 | 4 | 4 |
| ONES TOTAL | 6 | 16 | 4 | 16 | 4 | 8 | 4 |

LOGIC CIRCUIT FAULT DETECTOR

GOVERNMENT CONTRACT

The invention herein claimed was made in the course of or under a contract with the Department of the Navy.

BACKGROUND OF THE INVENTION

1. Field of the Invention

This invention relates to test apparatus and in particular to apparatus for testing digital logic circuit assemblies.

2. Description of the Prior Art

Digital logic circuit assemblies - such as those found on printed circuit boards frequently comprise a large number of individual logic circuits. These assemblies may be tested for faults by apparatus programmed in a manner unique to each type of assembly. A testing approach of this nature, however, requires experienced technical personnel to produce the programs and, furthermore, expensive apparatus to run the programs.

One testing technique which circumvents these requirements uses voltages which represent a fixed series of Gray code binary numbers to exercise all assemblies. In particular, the voltages representing the digits of each number are applied to respective input terminals of an assembly. For each good assembly of any one type, the same number of transitions between two voltage levels (hereinafter referred to as ZERO and ONE, respectively,) appears on corresponding output terminals and test points. In use, a GO/NO-GO test is performed by counting the transitions on output terminals. Assemblies producing the expected counts are classified as good while those producing unexpected counts are classified as faulty. Isolation of a fault may then be attempted by probing for an unexpected transition count on a test point.

Although this technique is relatively inexpensive to implement and use, applicant has found that it is not foolproof. In particular, applicant has found that an undetermined number of types of faults may occur (several disclosed hereinafter) which are not detected because the expected output counts are produced. Such limitations obviously limit the reliability of the technique.

SUMMARY OF THE INVENTION

An object of the invention is to extend the above-described technique to improve its reliability.

In accordance with the invention, ONEs produced in response to each input to an assembly under test are counted in addition to counting transitions between ZEROs and ONEs. Each good assembly of any one type when exercised by the same Gray code numerical input has the same ONEs count appearing on corresponding output terminals and test points. These counts are not necessarily the same as those produced when counting transitions. For example, assume the logic level on a given output terminal is ZERO for a particular Gray code binary number input. Then assume that level changes to a ONE for the next number input, remains at the ONE level for two more number inputs, and then changes back to a ZERO for the next number input. The transition count for this sequence of number inputs is two while the ONEs count is three. With the addition of ONEs counting, many previously undetected faulty assemblies are detected.

BRIEF DESCRIPTION OF THE DRAWING

In the drawing:

FIG. 2 shows a block diagram of a Gray code generator which may be used in practicing the invention;

FIG. 3 is a truth table showing the output of the generator of FIG. 2;

FIGS. 4 and 5 show block diagrams of transition and ONEs detectors, respectively;

DESCRIPTION OF THE DISCLOSED EMBODIMENT

Figure 1:
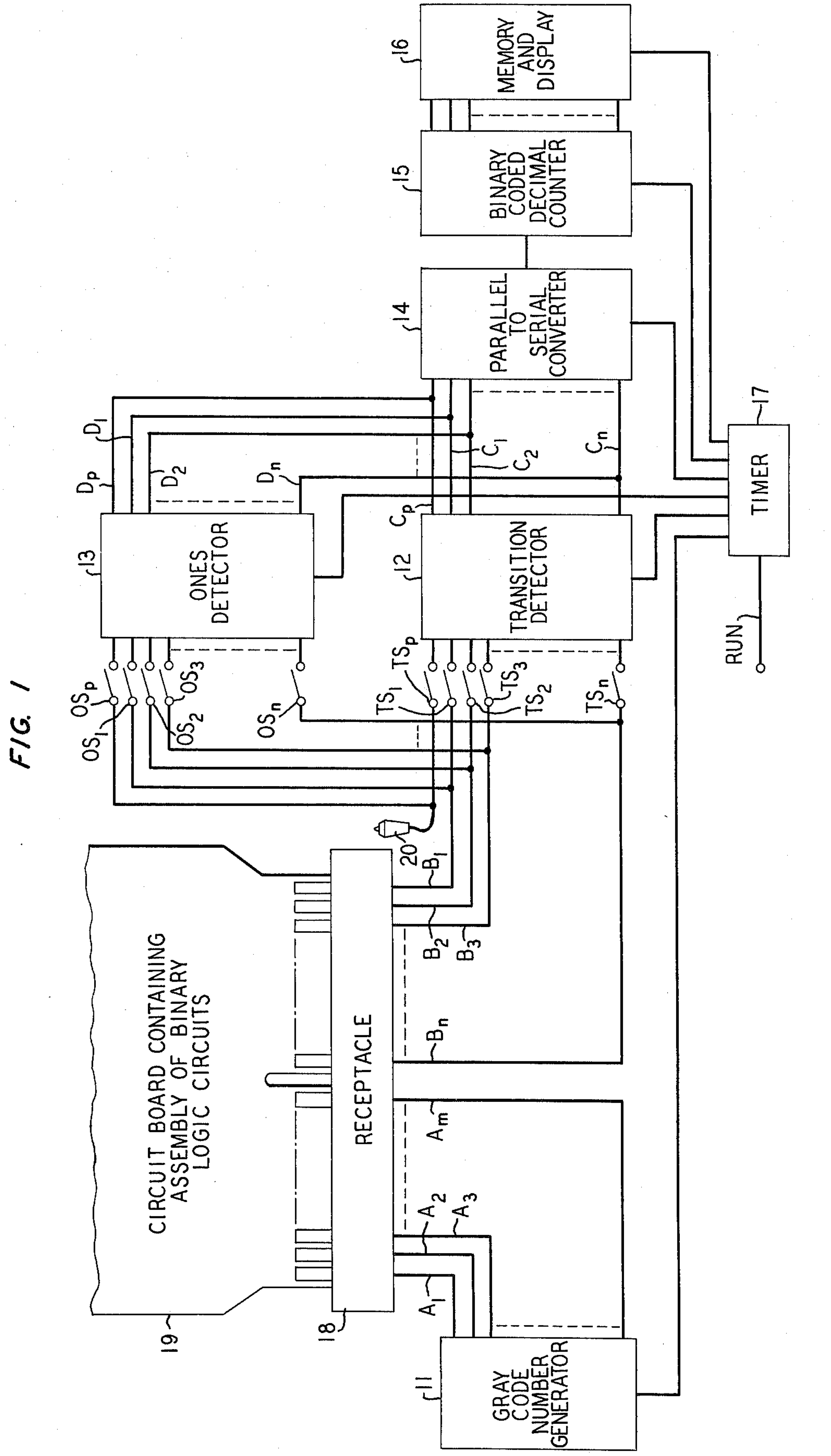
FIG. 1 shows a block diagram of test apparatus embodying the invention.

FIG. 1 discloses test apparatus comprising a Gray code number generator 11, a transition detector 12, a ONEs detector 13, a parallel-to-serial converter 14, a binary coded decimal counter 15, a memory and display 16, a timer 17, and a receptacle 18. FIG. 1 also discloses a circuit board 19 which contains an assembly of binary logic circuits. The function of the test apparatus is to check the circuit board for faults.

In response to clocking pulses from timer 17, generator 11 produces Gray code number related binary voltages (hereinafter referred to as ONEs and ZEROs) on leads $A_1$ through $A_m$ which in turn are applied via receptacle 18 to the input terminals of circuit board 19. The output terminals of circuit board 19 are connected via receptacle 18 to leads $B_1$ through $B_n$. Leads $B_1$ through $B_n$ are connected through transition switches $TS_1$ through $TS_n$, respectively, to transition detector 12 and also through ONEs switches $OS_1$ through $OS_n$ to ONEs detector 13. The output leads $C_1$ through $C_n$ of transition detector 12 and the output leads $D_1$ through $D_n$ of ONEs detector 13 are connected to parallel-to-serial converter 14. The serial output of converter 14 is coupled to counter 15 whose outputs in turn are coupled to memory and display 16.

In addition to supplying clocking pulses to generator 11, timer 17 provides timing pulses to detectors 12 and 13, converter 14, counter 15, and memory and display 16.

FIG. 1 also shows a probe 20 which may be connected to transition detector 12 by a transition switch $TS_p$ and to ONEs detector 13 by way of a ONEs switch $OS_p$. The outputs produced by detectors 12 and 13 when using probe 20 are applied to converter 14 by way of leads $C_p$ and $D_p$.

With the exception of ONEs detector 13 and its interconnection with the other elements of FIG. 1, the test apparatus of FIG. 1 embodies a prior art technique.

Generator 11 of FIG. 1 may take a number of different forms, one of which is shown in FIG. 2. The generator of FIG. 2 uses toggle flip-flops 31 through 34 (i.e., flip-flops which change state with each input of a particular type) and AND gates 35 through 39. Although FIG. 2 shows stages sufficient to produce three digit numbers, additional stages may, of course, be provided to produce larger output numbers. The output of generator 11 in response to input clock pulses is shown in a truth table in FIG. 3. This output is a reflected Gray code. The operation of the generator is so elementary and obvious that further discussion is considered unnecessary.

During each cycle of generator 11, all possible ONE and ZERO combinations appear on leads $A_2$ through $A_m$ during the times a ZERO appears on lead $A_1$ and, furthermore, also during the times a ONE appears on lead $A_1$. This characteristic is true for any of leads $A_1$ through $A_m$ with respect to the remaining leads. Furthermore, this is true for each of the combinations appearing on any group of the leads with respect to the remaining leads. This may be appreciated by referring to the table of FIG. 3. For *m* leads, the cycle of binary numbers shown in FIG. 3 for leads $A_1$, $A_2$, and $A_3$ is repeated $2^{(m-3)}$ times for a cycle of generator 11. During each of these times different ZERO and ONE combinations exist on the remaining leads; in fact, for a complete cycle of generator 11, all possible combinations are encountered once for a nonreflected Gray code and twice for a fully reflected Gray code.

The transition detector of FIG. 1 may also take a number of different forms. One form provides a combination such as that shown in FIG. 4 between each input and output lead of the detector. The combination of FIG. 4 includes a pair of prior art logic circuit differentiators. One of these differentiators comprises an AND gate 40 and an inverter 41 while the other differenciator comprises an AND gate 42 and an inverter 43. In addition to inverting, the inverters also introduce slight delays. Each differentiator produces a ONE output in the form of a pulse in response to its input changing from a ZERO to ONE. In order to detect ONE to ZERO changes, the input to one of the differentiators is inverted by an inverter 44. The outputs from the differentiators are applied via an OR gate 45 to the set input of a flip-flop 46 which functions as a memory device. Timer 17 of FIG. 1 applies a reset pulse to flip-flop 46 during the interval between recognition of its state by converter 14 of FIG. 1 and the next number output produced by generator 11.

The ONEs detector of FIG. 1 may be provided by using a combination such as that shown in FIG. 5 between each input and output lead of the detector. The combination of FIG. 5 includes an AND gate 47 which is enabled momentarily by timer 17 after the effects of each number output from generator 11 have appeared on leads $B_1$ through $B_n$. The inputs to detector 13 are thus sampled shortly after each clock pulse is applied to generator 11. When a ONE is sampled, a flip-flop 48 is set. The input from timer 17 is delayed by a delay device 49 and applied to reset flip-flop 48 after its output has been recognized by converter 14 of FIG. 1. Flip-flop 48 thus functions as a memory device.

Converter 14, counter 15, and memory and display 16 of FIG. 1 are commercially available components. Timer 17 (*a*) strobes converter 14 so that the parallel inputs are first accepted and then fed out one at a time in a serial manner, (*b*) periodically resets counter 15, and (*c*) periodically gates the output of counter 15 into memory and display 16. Such timing is straightforward and conventional as appreciated by those skilled in the art.

In operation, switches $TS_1$ through $TS_n$ of FIG. 1 are closed when it is desired to sum the transitions occurring on the output terminals of circuit board 19 for a cycle of generator 11. The closure of switches $TS_1$ through $TS_n$ on an individual basis permits the summing of transitions on individual output terminals of board 19. The closure of switch $TS_p$ permits probe 20 to be used for counting transitions at test points in the assembly on board 19. Use of the probe permits the assembly to be further tested to isolate a fault.

In a similar way, switches $OS_1$ through $OS_n$ are closed when it is desired to count the binary ONEs produced on leads $B_1$ through $B_n$ in response to each output from generator 11 and then to sum these counts for the complete sequence of outputs from generator 11. The closure of switches $OS_1$ through $OS_n$ on an individual basis permits the ONEs on a particular output terminal of board 19 to be counted for a complete cycle of generator 11. By closing switch $OS_p$, probe 20 may be used for fault isolation by counting ONEs on test points within the assembly of board 19.

Figures 6, 7:
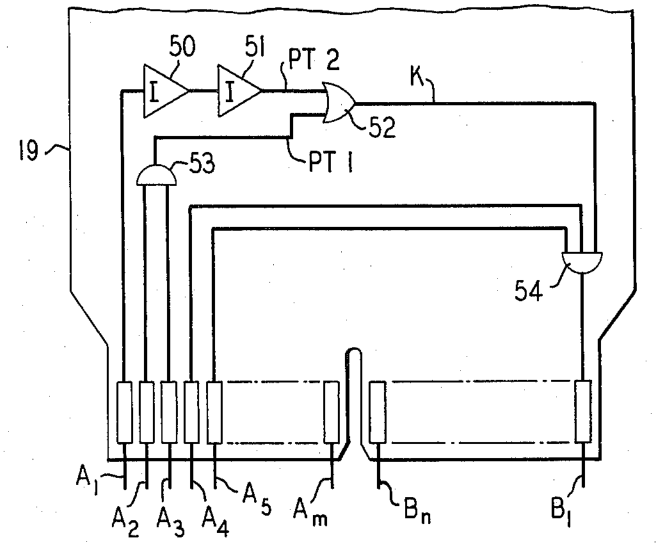
FIGS. 6 and 8 show block diagrams of some typical logic circuits used to explain the operation of the invention.
FIGS. 7 and 9 are truth tables related to the circuits of FIGS. 6 and 8.

Operation of FIG. 1 may be further appreciated by referring to FIGS. 6 and 7. FIG. 6 shows a circuit which may comprise an input portion of the assembly of board 19. The circuit comprises a pair of serially connected inverters 50 and 51 which are connected between an OR gate 52 and the board input terminal connected to lead $A_1$. (Series connected inverters are frequently used in this manner to introduce delay for timing purposes.) The circuit further includes an AND gate 53 connected between the input terminals of board 19 which are connected to leads $A_2$ and $A_3$, respectively, and OR gate 52. The output lead of OR gate 52 is identified as lead K, the output lead of AND gate 53 is identified as point 1, and the output lead of inverter 51 is identified as point 2.

FIG. 7 is a truth table showing the outputs on lead K for a complete cycle of reflected Gray code binary number related inputs on leads $A_1$, $A_2$, and $A_3$ when the circuit of FIG. 6 is good and when points 1 or 2 are stuck at either ONEs or ZEROs because of circuit faults. At the bottom of the table the transitions and the ONEs have been totaled. It should be noted that the transition count and the ONEs count differ for the circuit when it is nonfaulty. It should also be noted that the same transition count occurs for both a nonfaulty circuit and for one with point 1 stuck at ZERO. Still further, it should be noted that this false indication does not occur when counting ONEs.

As stated earlier, during each cycle of generator 11: (1) all possible ONE and ZERO combinations appear on leads $A_2$ through $A_m$ during the times a ZERO appears on lead $A_1$ and, furthermore, also during the times a ONE appears on lead $A_1$; (2) this characteristic is true for any of leads $A_1$ through $A_m$ with respect to the remaining leads; and (3) this characteristic is true for each of the combinations appearing on any group of the leads with respect to the remaining leads. The cycle of binary numbers shown in FIG. 7 for leads $A_1$, $A_2$, and $A_3$, for example, is repeated $2^{(m-3)}$ times for a cycle of generator 11. During each of these times different ZERO and ONE combinations exist on the remaining leads; in fact, for a complete cycle of generator 11, all possible combinations are encountered once for a nonreflected Gray code and twice for a reflected Gray code. This may be appreciated by considering the case where lead K and leads $A_4$ and $A_5$ of FIG. 6 feed an AND gate 54 which in turn in connected to output lead $B_1$, and, furthermore, leads $A_1$ through $A_5$ apply a reflected Gray code input to the board. The binary number cycle shown in FIG. 7 is applied to terminals $A_1$, $A_2$, and $A_3$ a total of eight times. Twice during these eight times the output on lead K is gated to lead $B_1$.

Counters 12 and 13, in this case, produce twice the totals shown in FIG. 7.

Because all possible combinations of ZEROs and ONEs are applied to a board by leads $A_1$ through $A_m$, all of the circuits on a circuit board are exercised and influence the outputs on lead $B_1$ through $B_n$. In the above example, AND gate 54 was exercised twice during the cycle of the reflected Gray code input. Use of the invention is not restricted, therefore, to testing only those logic circuits adjacent to the board input terminals.

Figures 8, 9:
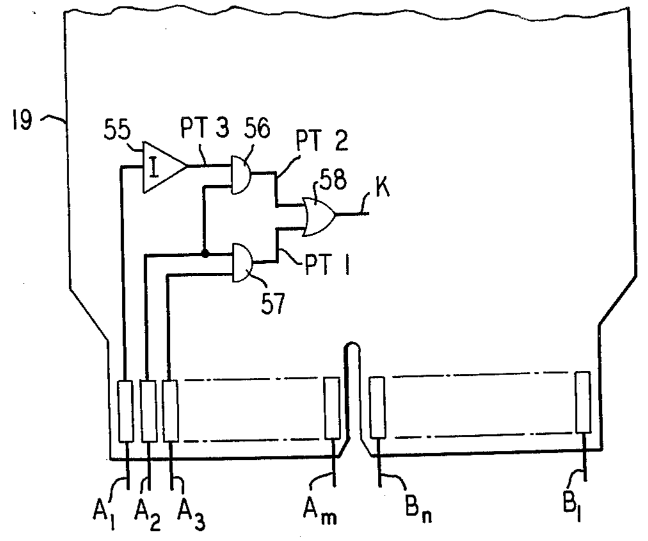

Still further appreciation of the operation of FIG. 1 may be obtained by referring to FIGS. 8 and 9. FIG. 8 shows another circuit which may comprise an input portion of the assembly of board 19. The circuit comprises an inverter 55 connected between an AND gate 56 and the board input terminal connected to lead $A_1$. A second input lead to AND gate 56 and the input lead to an AND gate 57 are connected to the board input terminal connected to lead $A_2$. A second input lead of AND gate 57 is connected to the board input terminal to which lead $A_3$ is connected. The output leads of AND gates 56 and 57 are connected to an OR gate 58 whose output lead is identified as K. The output leads of AND gates 57 and 56 and inverter 55 are identified as points 1, 2, and 3, respectively.

FIG. 9 is a truth table showing the outputs on lead K for a complete cycle of Gray code binary number related inputs on leads $A_1$, $A_2$, and $A_3$ when the circuit of FIG. 8 is good and when points 1, 2, or 3 are stuck at ONEs or ZEROs. It should be noted that the transition and ONEs counts differ for a good circuit. It should also be noted that the transition count technique indicates a good circuit for points 1, 2, and 3 stuck at ZERO and point 3 stuck at ONE, whereas the ONEs count technique did not give any false indications.

The apparatus disclosed in FIG. 1 shows detectors 12 and 13 sharing a single combination comprising converter 14, counter 15, and memory and display 16. This configuration requires the transition and ONEs counts to be made in succession. Simultaneous production of these counts is and has been accomplished through the addition of a second converter-counter-memory and display conbination with the detectors feeding the two combinations, respectively.

What is claimed is:

1. In test apparatus which produces a sequence of Gray code binary number related sets of outputs for application to the input terminals of a binary circuit assembly to be tested and, furthermore, which detects transitions between first and second levels on the output terminals of said assembly and indicates the number of said transitions occurring during said sequence, the improvement comprising the addition of means for detecting each time said first level occurs on at least one of said output terminals in response to each of said sets of outputs for indicating the number of said first levels occurring during said sequence, which numbers may be compared to known reference numbers.

2. Test apparatus for testing logic circuit assemblies, said apparatus comprising, a generator for applying a sequence of Gray code related sets of inputs to one of said assemblies, a transition detector for receiving the outputs from said assembly receiving said sets of inputs to produce an output each time said assembly outputs change between first and second logic levels, a logic level detector for receiving the outputs from said assembly receiving said sets of inputs to produce, when enabled, an output each time its inputs are at said first logic level, means enabling said logic level detector in synchronism with said sets of inputs, and means connected to said transition detector and said logic level detector to indicate the number of transition detector outputs and the number of logic level detector outputs occurring during said sequence of Gray code related sets of inputs, which numbers may be compared to known reference numbers.

3. Test apparatus for testing logic circuit assemblies, said apparatus comprising, a generator which produces a sequence of Gray code binary number related sets of outputs, means for applying said sets of outputs to the input terminals of one of said assemblies, a transition detector which produces outputs each time its inputs change between first and second logic levels, means for connecting said transition detector to the output terminals of said assembly to which said sets of outputs are applied, a logic level detector which, when enabled, produces outputs each time its inputs are at said first logic level, means enabling said logic level detector in synchronism with said sets of outputs, means for connecting said logic level detector to the output terminals of said assembly to which said sets of outputs are applied, and means connected to said transition detector and said logic level detector to indicate the number of transition detector outputs and the number of logic level detector outputs occurring during said sequence of generator outputs, which numbers may be compared to known reference numbers.

* * * * *